3,558,771
PROCESS FOR USING EGGSHELL COMPOSITIONS
FOR PROMOTING WOUND HEALING
Leslie L. Balassa, Tomahawk Lake,
Blooming Grove, N.Y. 10914
No Drawing. Continuation-in-part of application Ser. No. 619,007, Feb. 27, 1967. This application Feb. 12, 1968, Ser. No. 704,539
Int. Cl. A61k 17/00
U.S. Cl. 424—95
5 Claims

ABSTRACT OF THE DISCLOSURE

Wound healing compositions and the process of healing wounds with such compositions are described. The compositions comprise finely divided membrane-free eggshells or an admixture of eggshells and eggshell membranes.

---

This application is a continuation-in-part of my copending application Ser. No. 619,007, filed Feb. 27, 1967.

This invention relates to methods of promoting healing of wounds and compositions therefor containing finely divided eggshells.

Medicine has long been interested in improving the healing of wounds. Patients suffering from diabetes or undergoing extensive cortisone treatment show extremely slow rates of healing for any wounds which they receive. Thus, surgery on such patients involves additional risks not present with other patients. Moreover, rapid healing of wounds is particularly desired for patients in tropical countries where the risk of infection is high. Rapid healing is also desired in the case of soldiers who have been wounded in a battle zone and cannot easily and quickly be removed therefrom. Acceleration of wound healing is highly desirable in the case of patients who cannot readily be imobilized such as farm animals.

In evaluating the utility of a material to promote wound healing, a reproducible test is necessary to give comparative data. Such a test method has been described by Prudden et al. in: "The Acceleration of Wound Healing With Cartilage," Surgery, Gynecology and Obstetrics, 105:283 (1957). In this method, rats are tested in pairs, each pair receiving an identical surgical incision, only the one rat of the pair receiving a measured dose of the material whose wound healing properties is to be determined. The pair is then kept in the same cage and the tensile strengths of the wounds in the two rats are determined in millimeters of mercury. The difference in the tensile strengths between the treated rat and the control rat is expressed as the percentage improvement obtained. Considering biological variance it is believed that only difference of about 10% or more are significant.

There have been several recent developments reported concerning materials which promote wound healing. In this connection U.S. Pats. 3,194,732 and 3,196,075 describe the use of eggshell membranes in either fibrous or non-fibrous form as an effective agent for stimulating and assisting healing processes in damaged mammalian tissue. According to the disclosure of these patents the eggshell membranes are obtained by a rather complicated separation of this material from the eggshells by mechanical means or a combination of mechanical and chemical means. After this separation the membrane-free eggshells are discarded and the eggshell membranes utilized as a wound healing material.

Heretofore, no attempt was made to utilize the membrane-free eggshells or eggshells together with eggshell membranes as an accelerator or stimulant to assist in the healing process of damaged mammalian tissues. It had been assumed that no therapeutic effect would be expected from the eggshells because eggshells are principally composed of "inert" calcium compounds, i.e., about 90 to 97% calcium material.

Now it has been surprisingly discovered that finely divided eggshells with or without adhering membrane is effective as an accelerator for the healing of wounds.

Accordingly, one aspect of the present invention relates to novel methods of promoting and assisting the healing of wounds as, for example, damaged mammalian tissue, open ulcers, etc. in humans and animals.

Another aspect of the present invention relates to significant improvements in wound healing of tissue that has been lost or damaged as a result of injuries by the topical application of finely divided eggshells with or without eggshell membranes.

An additional aspect of the present invention is to provide novel articles of manufacture comprising finely divided eggshells.

These and other aspects of the present invention will be apparent from the following description.

As used herein the term "membrane-free eggshells" mean the calcareous portion of eggshells from which the membrane has been removed. The eggshells suitable for use in the present invention may be obtained from chickens or other birds and fowl, such as, for example, ducks.

Improvements in tensile strength have been obtained using finely divided eggshells following the method of Prudden et al., at least equal to the results reported by Prudden and his coworkers using cartilage derived materials.

As previously indicated, eggshells may be used alone or in combination with the eggshell membrane. The calcareous part of the egg may be separated from the eggshell membrane in a purely mechanical manner such as by rolling and pulling the membrane away from the washed eggshell after removal of the yolk and albumen of fresh or uncooked eggs. Cooked eggs may also be used for obtaining the membrane-free eggshells. Instead of employing mechanical means for effecting separation of the eggshell from its membrane a combination of chemical and mechanical means can be utilized in the manner described in U.S. Pat. 3,196,075.

The method of application of the membrane-free eggshells or eggshells with adhering membrane, can be carried out in accordance with the procedures developed for cartilage as described in my copending application Serial No. 435,693, filed Feb. 26, 1965, issued as U.S. Pat. No. 3,400,199. Thus, it is preferred to topically apply finely divided membrane-free eggshells directly to the wound surface. The finely divided wound healing materials used in accordance with the invention have a fineness ranging up to about 200 microns, preferably in the range of about 40 to 70 microns.

The finely divided eggshells with or without adhering membrane may be applied to the wound by dusting it on the open wound surface or by incorporation into a suitable carrier, e.g. an ointment. Alternatively, colloidal dispersions or solutions may be prepared with eggshells, preferably in isotonic saline and applied parenterally in the vicinity of the wound.

Topical application may also be carried out by blowing a metered amount of the material onto the wound using a hand atomizer. Alternatively, it may be applied by placing the material together with an inert gas under increased pressure (i.e. above atmospheric pressure) in a pressure vessel. In this latter means of application, termed aerosol application, the finely divided eggshell powder may be packaged as a dry aerosol powder as described in Dutch Pat. 6,415,252, published July 5, 1965 or an aerosol foam.

The wound healing agents of the present invention may be used alone, or with therapeutically effective agents such as ascorbic acid, ascorbyl palmitate; pharmaceutically acceptable zinc salts, e.g. zinc oxide, zinc citrate, zinc stearate; antiseptics such as lidocaine, procaine; antibiotics such as neomycin, chloroamphericol, sulfanilamide tetracycline, etc.; enzymes suitable for debridgement of the wound. The wound healing accelerators may also be combined with other wound healing agents, e.g. cartilage, chitin, etc.

The following examples are illustrative of the wound healing activity of the various materials of this invention. The wound healing efficiency is determined by using the method of Prudden et al., as described above. At least 10 pairs of rats are used to obtain a meaningful average for each material tested. In each of the following examples of powder insufflator is used to apply 2 to 10 mg. of material per cm.$^2$ of wound surface.

EXAMPLE 1

The shells of 12 fresh hen's eggs together with the adhering membrane-free of the yolk and albumen are washed with an isotonic saline solution followed by distilled water.

The eggshells are dried in a sterile atmosphere at ambient temperature. The dried eggshells with the adhering membrane are placed in a laboratory ball mill containing alundum balls and ball milled to a fineness between about 40 to 70 microns. The resulting product is a finely divided essentially non-fibrous powder. This powder is a mixture of finely divided eggshells (calcareous portion) and eggshell membranes.

The powdered product produced is then topically applied using a powder insufflator to 11 test rats of 11 pairs of rats and tested in accordance with the Prudden assay method described above. The powder was applied in an amount ranging from about 2 to 10 mg. per cm.$^2$ of wound surface.

The percent of wound healing for the treated rats, stating the control rats as 100% is about 135%. Thus, this product results in an average of 35% increase in wound healing over the untreated control animals.

EXAMPLE 2

The eggshell of 12 hen's eggs are freed from the adhering membrane by mechanical means as described in U.S. Pat. 3,194,732. The membrane-free eggshells are then placed in a laboratory ball mill and ground to a fineness of about 40 microns in the manner described in Example. 1.

The resulting membrane-free eggshell powder was topically applied in the manner described in Example 1 to 40 test rats of 40 pairs of rats The tests were carried out in accordance with the Prudden assay method and resulted in an average of 35% increase in wound healing over the untreated control animals.

EXAMPLE 3

The shells of 12 boiled hen's eggs were processed to a finely divided powder in the manner described in Example 1. This powder contains both the eggshell (calcareous portion) and eggshell membrane. This powder was topically applied to 10 test rats of 10 pairs of rats in the manner described in the previous examples. Employing the Prudden assay method, resulted in an average of 20% increase over the untreated control animals.

EXAMPLE 4

The shells of 12 fresh hen's eggs together with the adhering membrane, free of yolk and albumen, was washed with an isotonic saline solution followed by distilled water and then immersed in isopropanol. The eggshells are removed from the isopropanol and dried in a sterile atmosphere. The dried eggshells are placed in a laboratory ball mill and ground to a fineness between 40 and 70 microns.

The powdered product is topically applied to 18 test rats of 18 pairs of rats and tested in the manner as previously described. An average of about 20% increase in wound healing over the untreated control animals was observed.

A comparison of the results obtained in this example with those of Example 1 suggests that the use of isopropanol to sterilize the material reduces the activity of the active component in the eggshells.

A finely divided powder or dispersion of the wound healing materials of this invention may also be used in conjunction with materials such as cotton or cellulosic fibers and deposited as a coating or coatings on base materials such as cellulose or cellulose acetate or nylon or regenerated cellulose or plastic base materials either woven or non-woven, in sheet form, perforated or imperforate. Moreover, the finely divided eggshell may be bonded to a suitable base material e.g. cotton gauze, plastic sheet, etc. using an appropriate adhesive formulation, e.g. pectin, gelatin, starch, innocuous vegetable gums. The foregoing articles of manufacture can be obtained in accordance with the procedures described in the examples of U.S. Pat. 3,194,732.

The use of membrane-free eggshells or eggshells within adhering membrane as a wound healing accelerator provides numerous advantages over the use of eggshell membranes alone as described in U.S. Pats. 3,196,075 and 3,194,732. In the first place, eggshell membranes are relatively difficult to separate from eggs as recognized in column 2 of U.S. Pat. 3,196,075. In accordance with the present invention there is no necessity to separate the eggshell membrane from the eggshell in order to obtain a highly effective wound healing accelerator. Hence, there are substantial economies both in terms of time, equipment and materials because it is no longer required that the eggshell be removed from the membrane. In addition, the production of hen's eggs is very substantial. Consequently, the available quantity of eggshells is also large in relation to the adhering membrane which represents only a very small proportion of the non-utilized part of the egg for food or industrial purposes. Thus, the quantity of eggshell membrane available for therapeutic use is limited in comparison to the membrane-free eggshells or eggshells with adhering membrane.

What is claimed is:

1. A process for facilitating healing of a wound which comprises administering a therapeutically effective dosage of a composition containing at least one finely divided material having an average particle size ranging up to about 200 microns selected from the class consisting of membrane-free eggshells and a mixture of eggshells and eggshell membranes.

2. A process according to claim 1 wherein the therapeutic effective dose is administered topically .

3. A process according to claim 2 wherein said therapeutic dose contains finely divided membrane-free eggshells.

4. A process according to claim 2 wherein said therapeutic dose contains a mixture of finely divided eggshells and eggshell membranes.

5. A process according to claim 2 wherein said finely divided material of said therapeutic dose has an average particle size ranging up to about 70 microns.

References Cited

UNITED STATES PATENTS

| | | | |
|---|---|---|---|
| 2,669,518 | 2/1954 | Torr | 99—113 |
| 3,216,828 | 11/1965 | Koonz et al. | 99—113 |
| 3,098,790 | 7/1963 | Mettentleiter | 424—154 |
| 3,194,732 | 7/1965 | Neuhauser | 424—28 |
| 3,196,075 | 7/1965 | Neuhauser | 424—28 |
| 3,232,836 | 2/1966 | Carlozzi et al. | 424—180 |

ALBERT T. MEYERS, Primary Examiner

O. M. STEPHENS, Assistant Examiner

U.S. Cl. X.R.

424—28